(12) United States Patent
Wilson et al.

(10) Patent No.: US 11,947,433 B2
(45) Date of Patent: Apr. 2, 2024

(54) SYSTEM AND METHOD FOR SUBSCRIPTION BASED SOLUTION MANAGEMENT

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 243 days.

(21) Appl. No.: 17/570,679

(22) Filed: Jan. 7, 2022

(65) Prior Publication Data

US 2023/0222472 A1   Jul. 13, 2023

(51) Int. Cl.
*G06F 11/22* (2006.01)
*G06F 9/50* (2006.01)
(Continued)

(52) U.S. Cl.
CPC ........ *G06F 11/2247* (2013.01); *G06F 9/5044* (2013.01); *G06F 11/3051* (2013.01);
(Continued)

(58) Field of Classification Search
CPC ..... H04L 67/141; H04L 67/34; G06Q 20/127; G06Q 30/06; G06Q 30/0645; G06Q 50/10; G06F 8/60; G06F 8/61; G06F 8/71; G06F 9/445; G06F 9/44505; G06F 9/5044; G06F 11/2247; G06F 11/3051; G06F 15/177
See application file for complete search history.

(56) References Cited

U.S. PATENT DOCUMENTS 6,317,815 B1   11/2001   Mayer et al.
6,421,727 B1   7/2002   Reifer et al.
(Continued)

OTHER PUBLICATIONS

Souvik Chakravarty (2019). Arm System Control Processor (SCP) Firmware-101. Linaro. https://static.linaro.org/connect/san19/presentations/san19-117.pdf.
(Continued)

*Primary Examiner* — Thomas J. Cleary
(74) *Attorney, Agent, or Firm* — Womble Bond Dickinson (US) LLP

(57) ABSTRACT

Methods, systems, and devices for providing for providing computer implemented services using managed systems are disclosed. To improve the likelihood of the computer implemented services being provided, a subscription based model may be used to manage the managed systems. The subscription model may utilize a highly accessible service to obtain information regarding capabilities of managed systems to present information regarding all potential solutions that the managed systems may provide. By presenting users with such information, the users may not need to be well versed in the underlying hardware and software components necessary for the solutions to be provided. As the hardware components of a managed system are changed over time, the compatible solutions may be continuously updated so that users may be continuously appraised of possible solutions that may be provided using the managed systems.

18 Claims, 11 Drawing Sheets

(51) Int. Cl.
  *G06F 11/30* (2006.01)
  *H04L 67/00* (2022.01)
  *H04L 67/141* (2022.01)
  *G06Q 20/12* (2012.01)

(52) U.S. Cl.
  CPC ............ *H04L 67/141* (2013.01); *H04L 67/34* (2013.01); *G06Q 20/127* (2013.01)

(56) References Cited

U.S. PATENT DOCUMENTS

| | | | |
|---|---|---|---|
| 7,464,163 B1* | 12/2008 | Bantz | G06Q 10/06 370/259 |
| 9,178,948 B2 | 11/2015 | Chen et al. | |
| 9,705,995 B2 | 7/2017 | Edlund et al. | |
| 10,044,522 B1 | 8/2018 | Shamis et al. | |
| 11,588,909 B1* | 2/2023 | Wilson | H04L 67/1097 |
| 11,632,315 B1* | 4/2023 | Sawai | H04L 41/0627 709/224 |
| 11,671,379 B1* | 6/2023 | Wilson | H04L 47/829 709/226 |
| 11,770,456 B1* | 9/2023 | Patel | H04L 67/51 709/223 |
| 11,803,667 B2* | 10/2023 | Singh | G06F 21/73 |
| 2003/0131028 A1 | 7/2003 | Radi et al. | |
| 2005/0122900 A1 | 6/2005 | Tuulos et al. | |
| 2005/0182843 A1 | 8/2005 | Reistad et al. | |
| 2006/0010477 A1 | 1/2006 | Yu | |
| 2006/0136747 A1* | 6/2006 | Ahdout | G06Q 20/123 713/189 |
| 2007/0091862 A1 | 4/2007 | Ioannidis | |
| 2007/0214193 A1* | 9/2007 | Takahashi | H04L 41/0813 |
| 2008/0235784 A1 | 9/2008 | Basner et al. | |
| 2008/0256641 A1 | 10/2008 | Lo | |
| 2009/0077407 A1 | 3/2009 | Akimoto | |
| 2012/0005649 A1 | 1/2012 | Lavin | |
| 2012/0042388 A1* | 2/2012 | Rive | G06F 21/6218 726/26 |
| 2012/0076131 A1 | 3/2012 | Bianconi | |
| 2012/0144177 A1* | 6/2012 | Iyigun | G06F 1/3234 713/300 |
| 2012/0311673 A1 | 12/2012 | Sodah | |
| 2013/0198346 A1* | 8/2013 | Jubran | H04L 41/12 709/224 |
| 2013/0339306 A1 | 12/2013 | Kim et al. | |
| 2014/0074793 A1 | 3/2014 | Doering et al. | |
| 2015/0005033 A1 | 1/2015 | Petersson et al. | |
| 2015/0271276 A1 | 9/2015 | Edlund et al. | |
| 2015/0278323 A1 | 10/2015 | Melahn et al. | |
| 2015/0373012 A1 | 12/2015 | Bartz et al. | |
| 2016/0150396 A1 | 5/2016 | Milhizer | |
| 2016/0188868 A1* | 6/2016 | Otturu | G06F 21/44 713/1 |
| 2016/0231804 A1 | 8/2016 | Bulusu et al. | |
| 2017/0006119 A1 | 1/2017 | Pogrebinsky et al. | |
| 2017/0048713 A1* | 2/2017 | Guday | H04W 12/35 |
| 2017/0090912 A1 | 3/2017 | Fuglsang et al. | |
| 2017/0244783 A1 | 8/2017 | Maresca | |
| 2017/0359356 A1 | 12/2017 | Brandwine | |
| 2019/0044793 A1 | 2/2019 | Chew | |
| 2021/0067406 A1 | 3/2021 | Myers et al. | |
| 2021/0160255 A1 | 5/2021 | Cherkas et al. | |
| 2021/0342173 A1 | 11/2021 | Tsirkin | |
| 2021/0360074 A1 | 11/2021 | Long | |
| 2022/0164838 A1* | 5/2022 | Wang | G06Q 30/0601 |
| 2022/0200928 A1* | 6/2022 | Garrison | H04L 41/5054 |
| 2023/0171586 A1 | 6/2023 | Holmes | |
| 2023/0221784 A1* | 7/2023 | Wilson | H04L 67/30 713/300 |
| 2023/0221997 A1* | 7/2023 | Wilson | G06F 9/5044 718/104 |
| 2023/0222080 A1* | 7/2023 | Wilson | G06F 11/0754 710/309 |
| 2023/0222468 A1* | 7/2023 | Wilson | G06F 8/60 705/418 |
| 2023/0222469 A1* | 7/2023 | Wilson | G06F 9/5077 705/400 |
| 2023/0222470 A1* | 7/2023 | Wilson | G06F 8/65 705/400 |
| 2023/0222471 A1* | 7/2023 | Wilson | G06Q 20/127 705/400 |
| 2023/0224216 A1* | 7/2023 | Wilson | H04L 41/082 709/221 |
| 2023/0229512 A1* | 7/2023 | Sawal | G06F 9/5044 718/104 |
| 2023/0229516 A1* | 7/2023 | Sawal | G06N 3/04 718/104 |
| 2023/0229818 A1* | 7/2023 | Sawal | G06F 21/86 726/34 |
| 2023/0232549 A1* | 7/2023 | Sawal | H05K 5/0269 361/752 |
| 2023/0342787 A1* | 10/2023 | Mohanty | G06Q 30/014 |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

\* cited by examiner

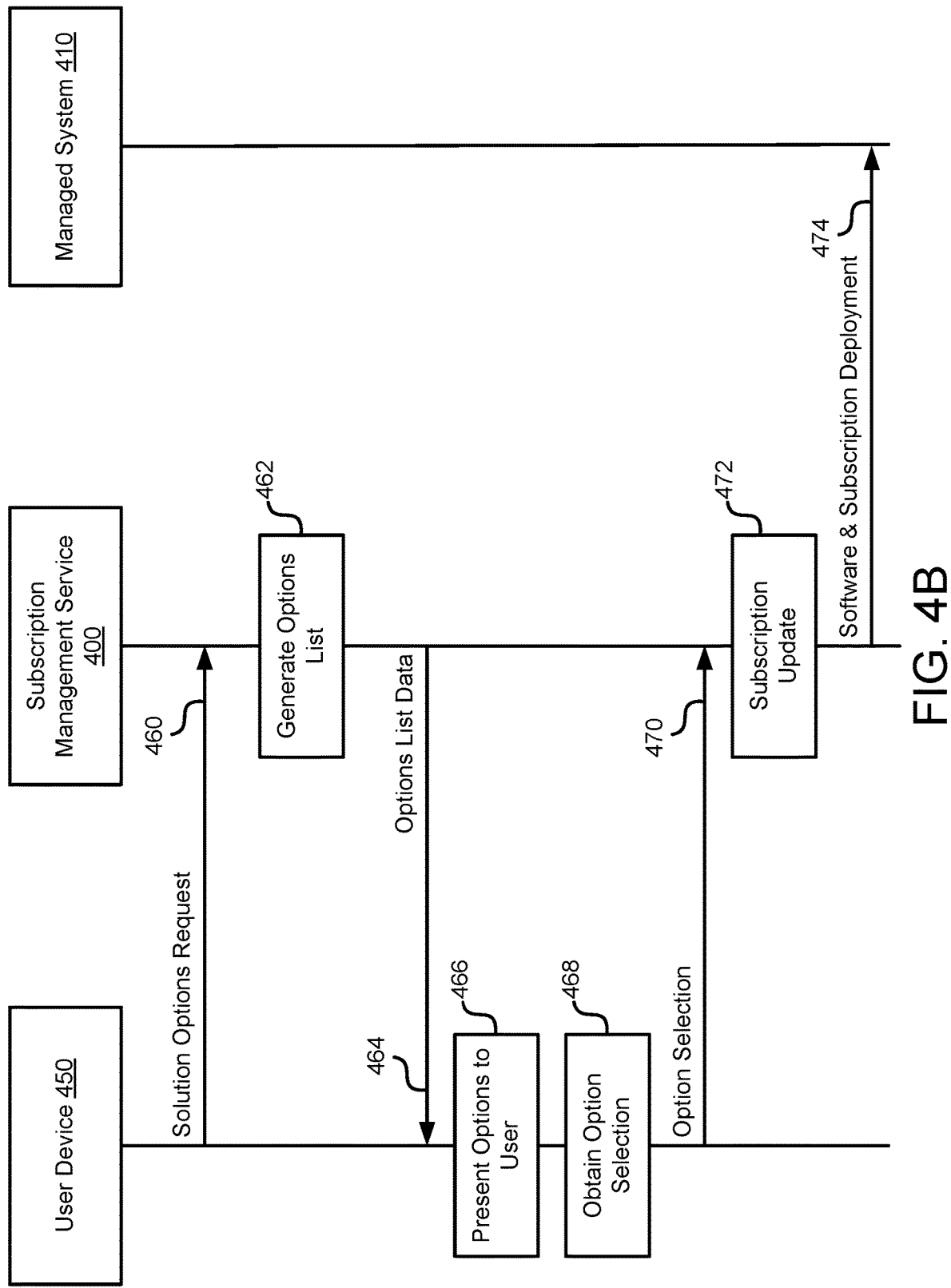

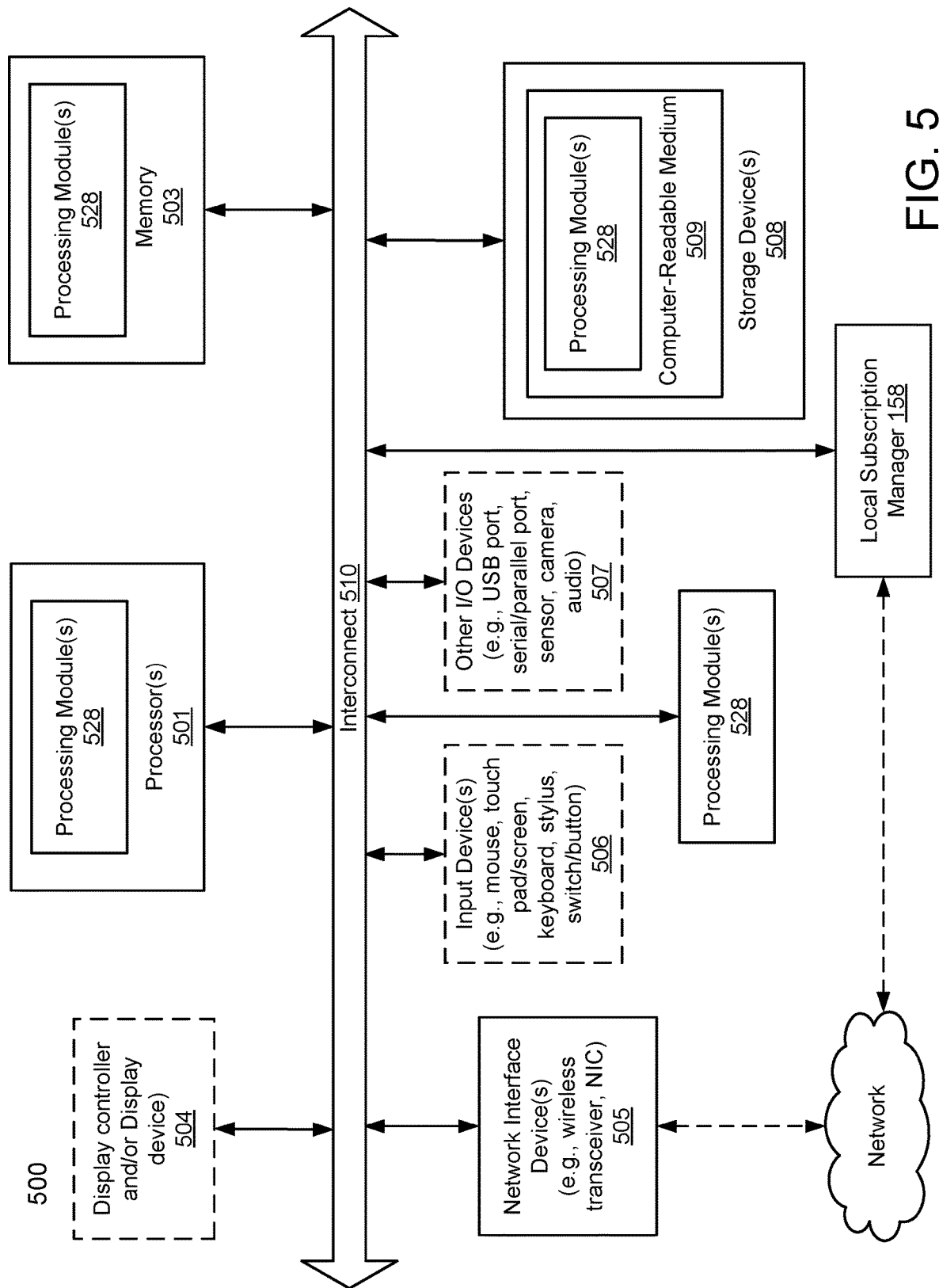

SYSTEM AND METHOD FOR SUBSCRIPTION BASED SOLUTION MANAGEMENT

FIELD DISCLOSED HEREIN

Embodiments disclosed herein relate generally to system management. More particularly, embodiments disclosed herein relate to systems and methods to manage subscription based deployment of solutions to compatible managed systems.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIGS. 4A-4B show diagrams illustrating interactions between and actions of components of a system in accordance with an embodiment.

FIG. 5 shows a block diagram illustrating a computing device in accordance with an embodiment.

DETAILED DESCRIPTION

Figure 1A:
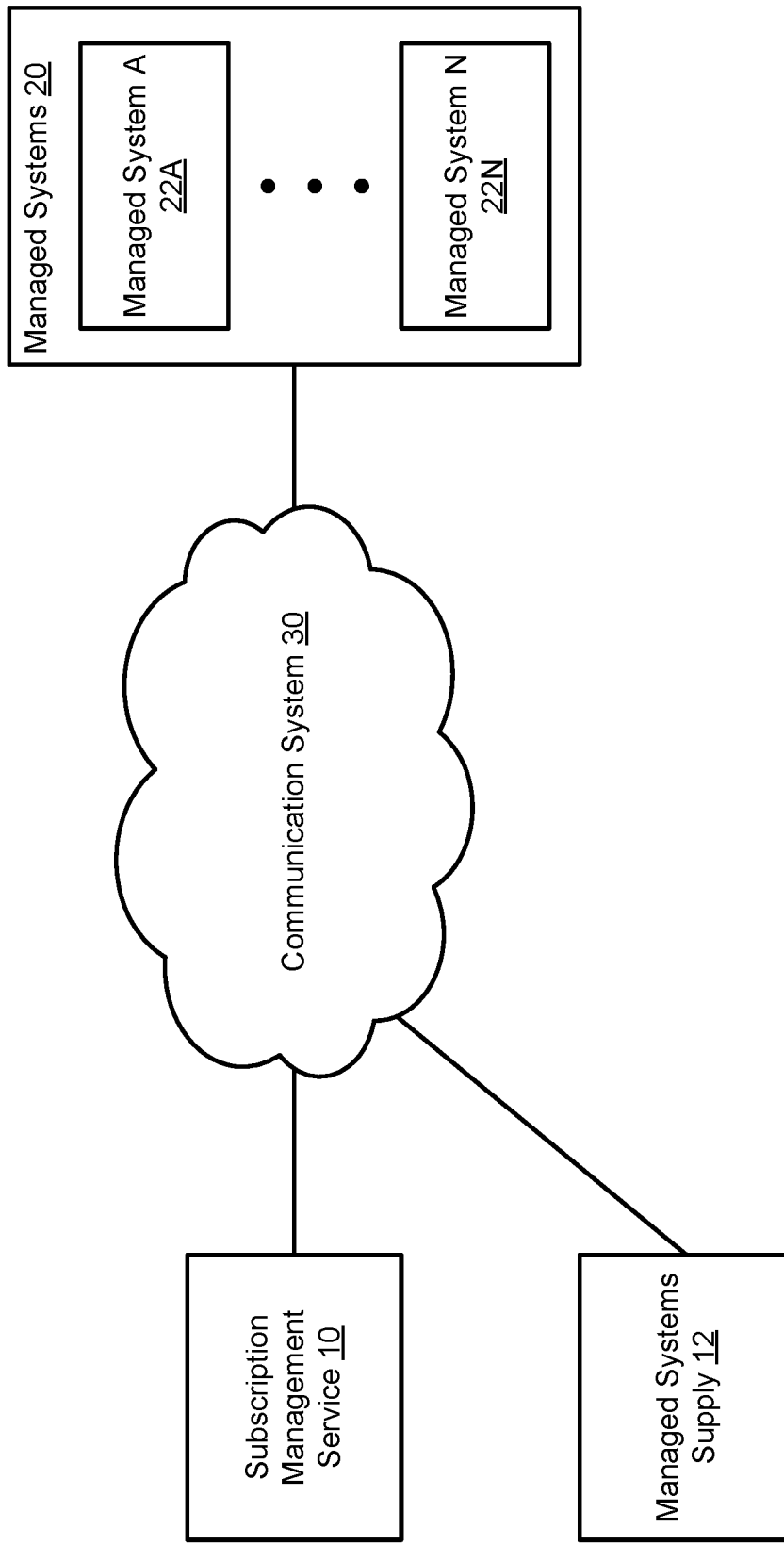
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs. An aggregation of different types of computer implemented services may need to be provided so that corresponding solutions may be provided.

To improve the likelihood of the computer implemented services being provided, embodiments disclosed here relate to methods and systems for managing managed systems using a subscription based model. The subscription model may utilize a highly accessible service to obtain information regarding capabilities (e.g., hardware resources) of managed systems to present information regarding all potential solutions that the managed systems may provide.

By presenting users with such information, the users may not need to be well versed in the underlying hardware and software components necessary for the solutions to be provided. Further, as the hardware components of a managed system are changed over time, the compatible solutions may be continuously updated so that users may be continuously appraised of all possible solutions that may be provided using the managed systems.

By having access to this information, users may make better informed decisions regarding which solutions should be implemented by managed systems. Further, by continuously updating the compatible solutions presented to users, the cognitive burden on the users may be greatly reduced as the hardware components of the managed systems change over time. Additionally, by virtue of this selection approach, deployment of various components for incompatible solutions may be avoided thereby preventing impairments of the managed systems.

After a solution for a managed system is selected, various subscriptions for the managed system may be updated. Updating the subscriptions may cause various software components (e.g., a software stack) to automatically and without user intervention to be installed on a managed system thereby causing the managed system to provide computer implemented services in a manner compatible with the selected solution.

In an embodiment, a computer-implemented method for managing computer implemented services provided by a managed system is provided. The method may include identifying, by a local subscription manager of the managed system, a startup of the managed system, the startup placing the managed system in an operating state conducive to operation of one or more applications that provide the computer implemented services; obtaining, by the local subscription manager, an inventory for the managed system from a startup entity of the managed system performing the startup; making a determination, by the local subscription manager, that the inventory indicates a change in hardware resources of the managed system; in response to the determination: identifying, by the local subscription manager, a change in solution compatibility for the managed system based on the inventory; and enforcing, by the local subscription manager, the change in the solution compatibility on the managed system.

Making the determination may include making a comparison of the inventory to a last obtained inventory, the last obtained inventory being stored in the local subscription manager; and identifying one or more solutions based on the comparison. The comparison may indicate that at least one hardware resource has been added to or removed from the managed system after a last startup of the managed system was completed.

Identifying the change in solution compatibility may include matching the inventory to one or more entries of a solution requirements repository that specifies hardware resource requirements for a number of respective solutions, each of the number of respective solutions being associated with a correspond software stack for providing a corresponding solution of the number of respective solutions; identifying one or more solutions based on the matching; making a comparison of a listing of solutions specified by a compatible solutions repository maintained by the local subscription manager to the identified one or more solutions; and identifying the change in the solution compatibility based on the comparison, the change in solution compatibility indicating at least one of an addition of a new solution and a removal of a previously compatible solution.

Identifying the change in solution compatibility may include providing a copy of the inventory to a management entity, the management entity being adapted to manage a software stack hosted by the managed entity; and receiving a list specifying, at least in part, the change in the solution compatibility, the list being received from the management entity.

The management entity may be hosted by a data processing system that is separated from the managed system, the managed system may be operably connected to the data processing system. The local subscription manager may include a second data processing device hosted by the managed system, the managed system and second data processing system may operate independently, the local subscription manager may be adapted to modify a software stack hosted by the managed system to match a solution to which the managed system is subscribed, and the management entity may manage the subscription of the managed system to the solution.

Enforcing the change in the solution compatibility on the managed system may include updating a compatible solutions repository based on the change in the solution compatibility; after updating the compatible solutions repository: receiving a solution update request; making a second determination, based on the updated compatible solutions repository, that a solution specified by the solution update request is not compatible with the managed system; and rejection the solution update request. The compatible solutions repository, prior to being updated, may indicate that the solution specified by the solution update request is compatible with the managed system.

Enforcing the change in the solution compatibility on the managed system may include providing a deployment manager with a compatibility update data package, the compatibility update data package indicating, at least in part, addition of a new solution with which the managed system is compatible or removal of an existing solution with which the manages system is no longer compatible to screen the managed system from solution update requests that specify solutions which are incompatible with the managed system.

The deployment manager may manage a deployment including the managed system by providing the managed system with solution updates that are compatible with the managed system, and the deployment manager may include a data processing system distinct from the managed system.

The computer implemented services provided by the managed system may correspond to a software stack hosted by the hardware resources of the manage system, and the change in solution compatibility may indicate an expansion or contraction of compatibility of the hardware resources with software stacks that may provide different computer implemented services.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices (e.g., data processing systems) that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services. Changes in the hardware and/or software components may provide for various types of different computer implemented services to be provided over time.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
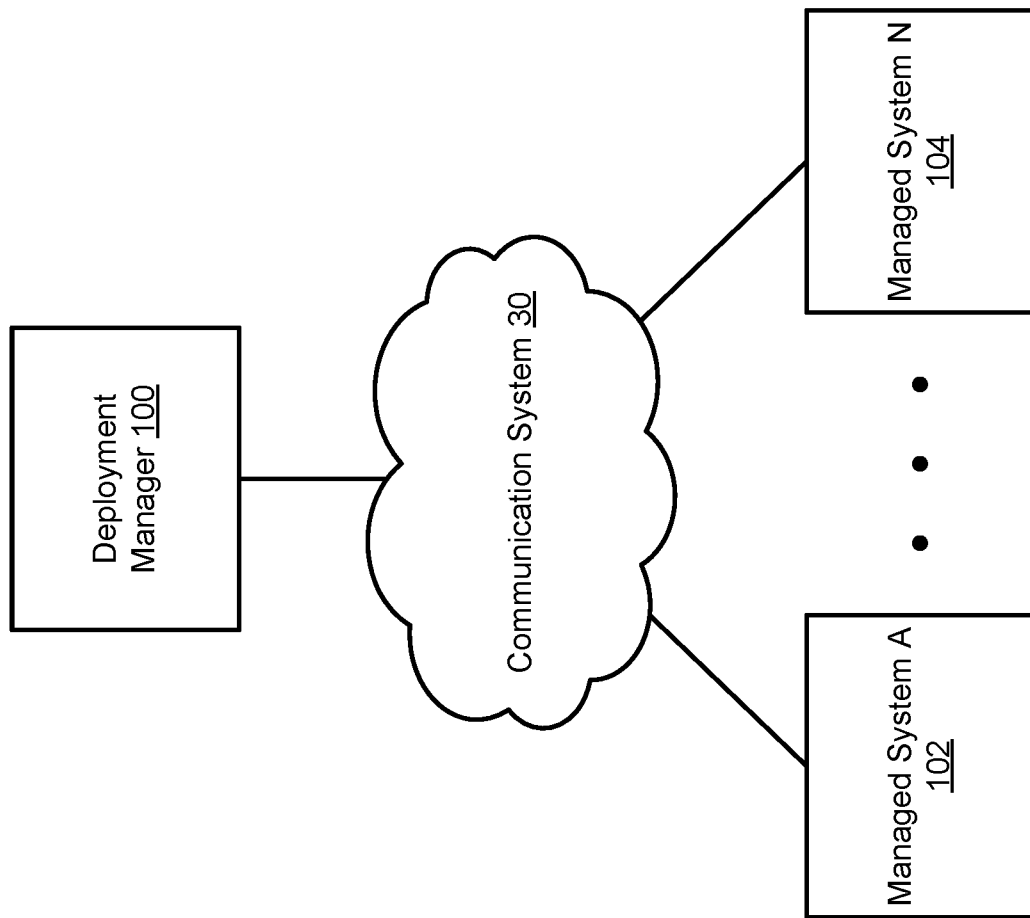
FIG. 1B shows a block diagram illustrating a deployment in accordance with an embodiment.
Figure 1C:
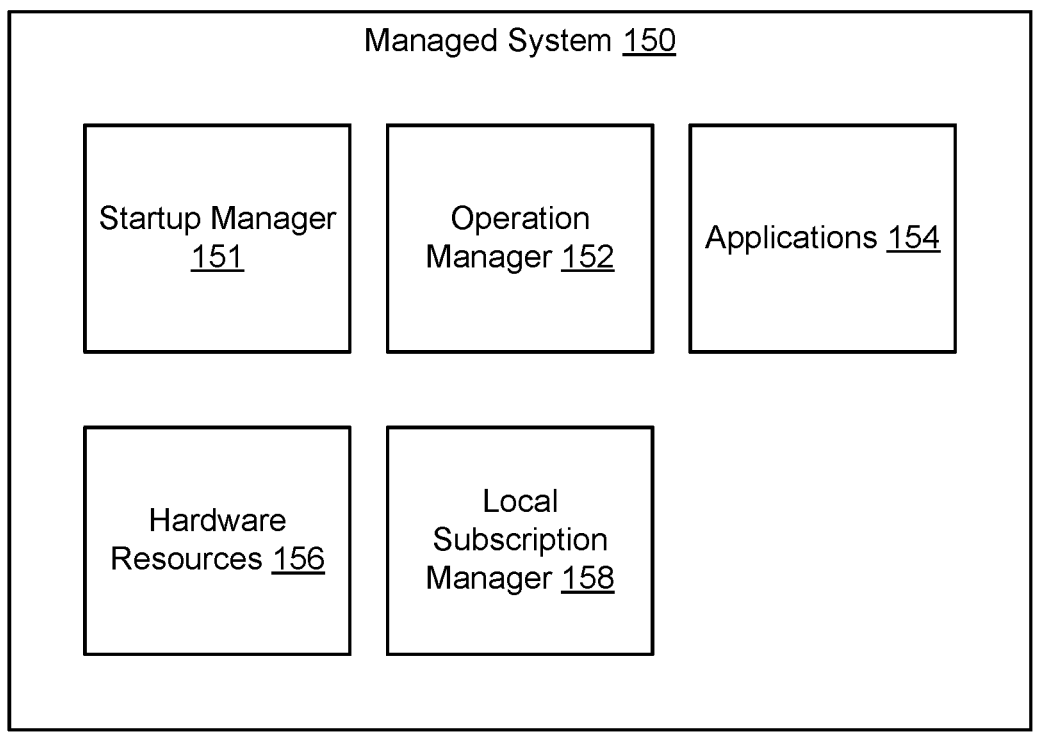
FIG. 1C shows a block diagram illustrating a managed system in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components, software components, and/or applications may need to be implemented by managed systems 20 depending on the computer implemented services desired to be provided by the respective managed systems. Refer to FIG. 1C for additional details regarding managed systems 20.

Additionally, any number of the managed system may operate (e.g., as part of a deployment) to provide various computer implemented services independently or cooperatively with other such managed systems. In such scenarios, the operation of a group of managed system may be managed by a local control plane for those managed systems. Refer to FIG. 1B for additional details regarding groups of managed systems.

However, to provide desired computer implemented services, corresponding configurations of hardware and/or software components (e.g., applications) necessary for corresponding computer implemented services to be provided by the managed systems may need to be identified, which may be technically challenging. For example, a person may need to be familiar with a range of hardware and software components issues to effectively select the hardware components and/or software components of a system so that the system is capable of providing the desired computer implemented services. Further, if a system is procured that lacks necessary hardware and/or software components, the procured system may not be able to provide its desired functions.

Additionally, after a system is procured, it may be challenging to identify to what extent the managed system may be reconfigured to provide different types of desired computer implemented services. Subsequent changes to the hardware components of a managed system may make management even more problematic because such changes may limit or expand the range of solutions with which a managed system may provide.

In general, embodiments disclosed herein relate to system, devices and methods for managing one or more managed systems in a manner that may improve the likelihood of the managed system being able to provide desired computer implemented services over time. To do so, a system in accordance with embodiments disclosed herein may provide a distributed system for automatically identifying and implementing hardware and/or software configurations of managed systems (e.g., to provide an integrated solution). The distributed system may automatically perform processes for discovering changes in solution compatibilities of managed systems as the managed systems are changed over time. The discovered solution compatibilities may empower persons tasked with managing such systems by ensuring that the persons are aware of all of the capabilities of the managed systems.

By doing so, embodiments disclosed herein may (i) reduce the cognitive burden for selecting and managing systems to provide desired computer implemented services, (ii) may improve the quality of computer implemented services by ensuring that that capabilities of the managed systems are known, and/or (iii) facilitating repurposing of managed systems over time as the hardware and/or software components of the managed systems are changed over time thereby improving the quantity and types of computer implemented services provided by the managed systems.

To provide the above noted functionality, a system in accordance with an embodiment may include subscription management service 10. Subscription management service 10 may facilitate (i) selection and procurement of managed system to a client site (e.g., a deployment location), and (ii) automatic configuration of managed systems 20 to provide an integrated solution and/or different solutions over time. To do so, subscription management service 10 may (i) obtain information indicating desired functions of one or more of managed systems 20, (ii) select and deploy one or more managed systems 20 to a client site (e.g., which may be stored in managed systems supply 12 prior to deployment), (iii) track changes in the solution compatibilities of managed systems 20 over time, and (iv) use the tracked changes in solution capabilities to select and deploy changes in solutions provided by managed systems 20. To deploy a new solution, a software stack (e.g., operating system, applications, drivers, etc.) may be instantiated on the managed system. However, various software stacks may have requirements regarding hardware resources necessary for operation of the software stacks. The tracked changes in the solution capabilities may be used to restrict (e.g., from deployment) software stacks that may be impaired (e.g., entirely or partially) when deployed to a managed system and allow other software stacks that may be unlikely to be impaired when deployed to the manages system.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made one the basis that the requesting entity may be likely to request additional features and/or capabilities in the future. Consequently, managed systems 20, when deployed to a client site, may include sufficient hardware components to address a range of different use cases and solution, beyond those that may be immediately apparent to a requesting entity. The additional capabilities (e.g., various hardware resources) may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20). However, over time the hardware resources of the managed systems may change thereby changing the compatibility of managed systems with various solutions over time.

The distributed system may allow a provider of managed systems 20 to selectively manage various functionalities provided by managed systems 20. For example, the distributed system may allow for different solutions to be provided by managed systems 20 over time. By doing so, a provider of managed systems 20 may tailor the functions provided by managed systems 20 (e.g., from all possible functions) to only those requested, desired, and/or procured by an operator, manager, and/or user of managed systems 20. Doing so may allow for cost controls for various solutions to be put in place by a user of a managed system.

For example, consider a scenario where a provider of a managed system does so on a contractual basis where a user of the managed system agrees to purchase subscriptions for various functionalities, hardware components, and/or software components (e.g., the aggregate being solutions). The user may use subscription management service 10 to select to which of the aforementioned solutions the user wishes to have enabled, to the extent of such enablement, durations of enablement, etc. After an initial selection leading to deployment of managed systems 20, the user may modify their subscription to allow for other solutions to be provided by managed systems 20. In response, subscription management service 10 may cooperate with local subscription managers hosted by managed systems 20 to reconfigure the operation of managed systems 20 to allow these additional features to be utilized by the users.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client/user devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service.

To facilitate solution selection, the graphical user interfaces presented to the users may present solutions that are compatibility with managed systems 20. The presented solutions may be based on a current configuration of managed systems 20. Accordingly, the persons tasked with managed systems may not need to be aware of the current configuration of managed systems 20 to identify which solutions the managed systems may provide.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information). Consequently, user access to solutions provided by managed systems may be automatically revoked by the managed systems thereby facilitating distributed management of the managed systems that does not rely on or require communication with other entities.

Any of subscription management service 10, managed systems supply 12, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

In an embodiment, one or more of subscription management service 10, managed systems supply 12, and managed systems 20 are operably connected via communication system 30. Communication system 30 may allow any of subscription management service 10, managed systems supply 12, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 5), a public network, and/or may include the Internet. For example, managed systems 20 may be operably connected to subscription management service 10 via the Internet. Subscription management service 10, managed systems supply 12, managed systems 20, and/or communication system 30 may be adapted to perform one or more protocols for communicating via communication system 30.

While illustrated in FIG. 1 with a limited number of specific components, a system may include additional, fewer, and/or different components without departing from embodiments disclosed herein.

Turning to FIG. 1B, a block diagram illustrating a deployment including managed systems 102, 104 in accordance with an embodiment is shown. Like named components in FIGS. 1A-1B may be similar.

The deployment may provide any number and type of computer implemented services. The deployment may be located, for example, at a user selected site, a data center, or another location. The deployment may provide various solutions to users of, for example, an organization on a contractual basis. For example, the organization may agree to pay fees for the solutions provided by the deployment. The solutions may include any number and type of computer implemented services provided by any number of managed systems 102, 104.

The deployment may include deployment manager 100. Deployment manager 100 may locally manage any number of managed systems. For example, the subscription management service may provide information to deployment manager 100 which may in turn manage managed systems 102, 104 based on the information.

To facilitate management, deployment manager 100 may (i) host various software images to facilitate deployment of software necessary for various solutions for managed systems 102, 104, (ii) facilitate identification of solutions compatible with managed systems 102, 104, (iii) provide information regarding the compatible solutions to other entities (e.g., such as the subscription management service), and/or (iv) provide other management functionalities.

Deployment manager 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

Turning to FIG. 1C, a block diagram illustrating managed system 150 in accordance with an embodiment is shown. Managed system 150 may be similar to any of managed systems 20 shown in FIGS. 1A-1B. Managed system 150 may provide desired computer implemented service by allowing for its automatic reconfiguration over time based on subscriptions maintained by subscription management service 10, shown in FIG. 1A. When reconfigured, managed system 150 may provide a solution which may be provided with a software stack hosted by managed system 150.

Managed system 150 may be reconfigured by, for example, deploying different software stacks.

In addition (and/or alternatively) to any of the components shown in FIG. 5, managed system 150 may include startup manager 151, operation manager 152, applications 154, hardware resources 156, and local subscription manager 158. Each of these components is discussed below.

Startup manager 151 may manage placing managed system 150 in an operating state conducive to operation of applications 154. For example, after managed system 150 is power cycled, managed system 150 may not be in a state in which application 154 may operate. To enter the operating state, managed system 150 may perform any number processes such as (i) a power on self-test, (ii) performing an inventory of hardware resources 156, and (iii) beginning execution of and/or handing off operation management of managed system 150 to operation manager 152. Startup manager 151 may be implemented with, for example, a basic input output system (BIOS) or other type of startup management entity.

Operation manager 152 may generally manage operation of the component of managed system 150, except for local subscription manager 158. For example, operation manager 152 may be implemented with an operating system used to manage hardware resources 156 of managed system 150 to facilitate execution of applications 154.

To facilitate dynamic changes in solutions provided by operation manager 152 and/or applications 154, local subscription manager 158 may facilitate automatic deployment of software stacks to managed system 150. The deployed software stacks may include all, or a portion, of operation manager 152 and applications 154. To ensure that only software stacks compatible with hardware resources 156 are deployed, local subscription manager 158 may maintain current information regarding hardware resources such as the types and quantities of hardware devices of hardware resources 156. Local subscription manager 158 may use the current information to identify compatibility between managed system 150 and various solutions, and enforce solution limitations (e.g., restrict) on managed system 150.

Applications 154 may provide all, or a portion, of the computer implemented services desired by a user, operator, or other person associated with managed system 150. Applications 154 may utilize hardware resources 156 to provide their respective functionalities. The type and quantity of applications 154 that may be hosted by managed system 150 may depend on hardware resources 156 (e.g., types and quantity of hardware devices).

Operation manager 152 may mediate presentation of hardware resources 156 to applications 154 by, for example, scheduling use, managing discontinuous access, and/or performing other actions to coordinate use of hardware resources 156 by applications 154 (and/or other entities). Consequently, the operation of applications 154 may be predicated on the operation of operation manager 152 as well as capabilities of hardware resources 156.

In an embodiment, one or more of startup manager 151, operation manager 152, and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of startup manager 151, operation manager 152, and applications 154. One or more of startup manager 151, operation manager 152, and applications 154 may be implemented using other types of hardware devices without departing embodiment disclosed herein.

In an embodiment, one or more of startup manager 151, operation manager 152, and applications 154 is implemented using a processor adapted to execute computing code stored on a persistent storage that when executed by the processor performs the functionality of one or more of startup manager 151, operation manager 152, and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of startup manager 151, operation manager 152, applications 154, and/or other entities not shown in FIG. 1C. As part of their respective operation, hardware resources 156 may host firmware and/or may otherwise be programmable to facilitate their respective operation.

Local subscription manager 158 may provide subscription management services. Subscription management services may include (i) identifying solution compatibilities of managed system 150, and (ii) limiting software stack deployment to managed system 150 based on the solution compatibilities By providing its functionality, local subscription manager 158 may manage the configuration, behavior, and/or functionality of managed system 150 in a manner that automatically conforms it to match that expected by subscription management service 10 (e.g., to match those solutions to which managed system 150 is subscribed). As part of the aforementioned process, local subscription manager 158, subscription management service 10, and/or deployment manager 100 may cooperate to enforce subscriptions on managed system 150. Local subscription manager 158, subscription management service 10, and/or deployment manager 100 may also perform one or more authentications of one another and/or communications from these components to prevent other entities from interfering with the cooperative operation of local subscription manager 158, subscription management service 10, and/or deployment manager 100 for managed system management purposes.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 510, shown in FIG. 5), and may operate independently from other components (e.g., hardware and software) of managed system 150. The management controller may include functionality to manage the operation, configuration, and/or other characteristic of any hardware and/or software component of managed system 150. For example, the management controller may include functionality to load software stacks on managed system, obtain information regarding hardware resources 156, etc.

In an embodiment, the management controller includes a separate communication interface (e.g., from that of a communication interface of managed system 150) through which it communicates with subscription management service 10 and/or deployment manager 100. In an embodiment, the management controller uses the same communication interface which managed system 150 uses to communicate with other devices. Either of these communication interface may facilitate communications with communication system 30, and devices connected to communication system 30 such as subscription management service 10 or deployment manager 100.

Figure 1D:
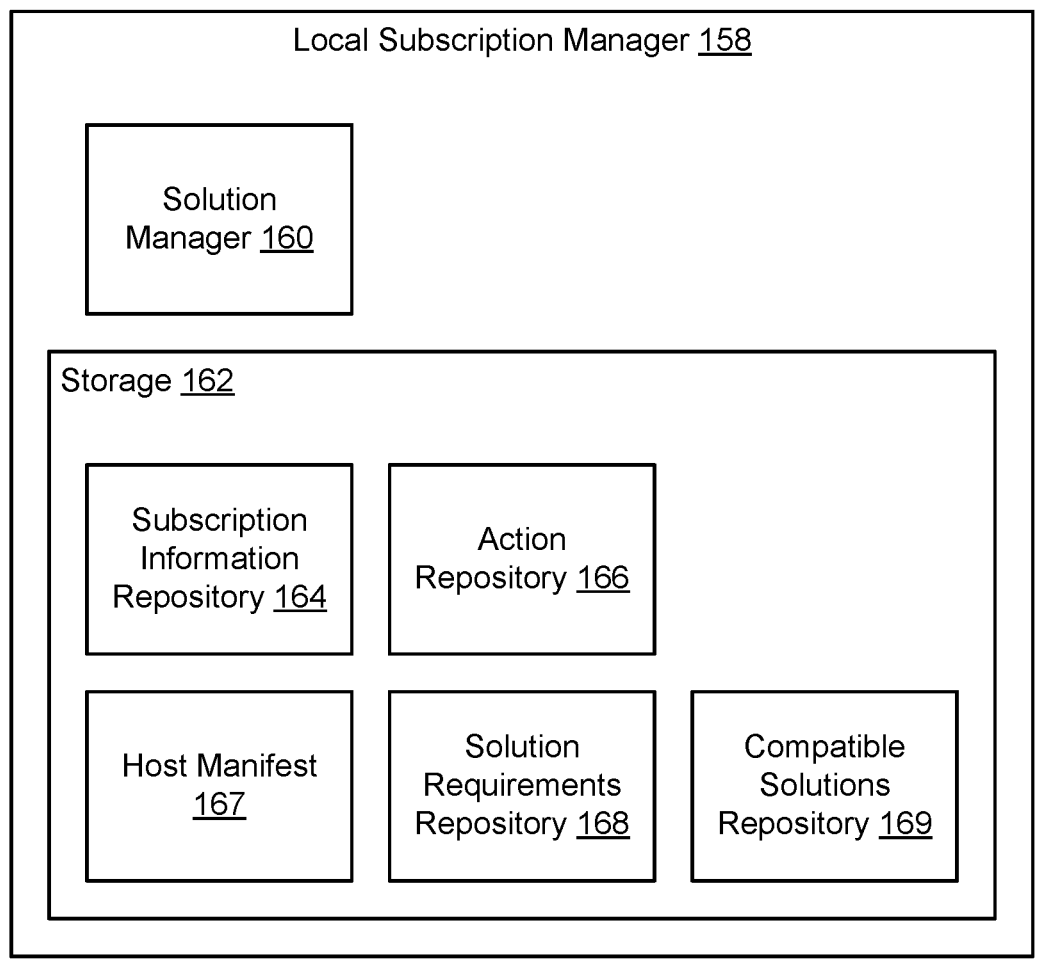
FIG. 1D shows a block diagram illustrating a local subscription manager in accordance with an embodiment.

When providing its functionality, local subscription manager 158 may perform all, or a portion, of the methods and operations illustrated in FIGS. 2-4B. Refer to FIG. 1D for additional details regarding local subscription manager 158.

While illustrated in FIG. 1C with a limited number of specific components, a managed system may include additional, fewer, and/or different components without departing from embodiments disclosed herein.

Turning to FIG. 1D, a block diagram of local subscription manager 158 in accordance with an embodiment is shown. Local subscription manager 158 may be implemented with a computing device similar to that illustrated in FIG. 5. In addition (and/or alternatively) to any of the components shown in FIG. 5, local subscription manager 158 may include solution manager 160 and storage 162. Each of these components is discussed below.

Solution manager 160 may include functionality to (i) obtain information regarding hardware resources of a host managed system, (ii) identify solution compatibilities of the host managed system based on the hardware resources information and information included in solution requirements repository 168, and (iii) enforce changes in solution compatibilities of the host managed system on the host managed system over time. To enforce the changes in solution compatibilities, solution manager 160 may (i) distribute information regarding the changes in solution compatibilities of the host managed system to other entities to prevent attempts to deploy incompatible software stacks to the host managed system and/or (ii) reject software stack deployment attempts to the host managed system for software stacks that are incompatible with the host managed system. By doing so, a host managed system may be more likely to provide desired computer implemented services by improving the likelihood that a managed system is configured to provide more desirable solutions.

In an embodiment, solution manager 160 is implemented using a hardware device including circuitry. The hardware device may be, for example, a digital signal processor, a field programmable gate array, or an application specific integrated circuit. The circuitry may be adapted to cause the hardware device to perform the functionality of solution manager 160. Solution manager 160 may be implemented using other types of hardware devices without departing embodiment disclosed herein.

In one embodiment, solution manager 160 is implemented using a processor adapted to execute computing code stored on a persistent storage that when executed by the processor performs the functionality of solution manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164, action repository 166, host manifest 167, solution requirements repository 168, and compatible solutions repository 169.

Figure 1E:
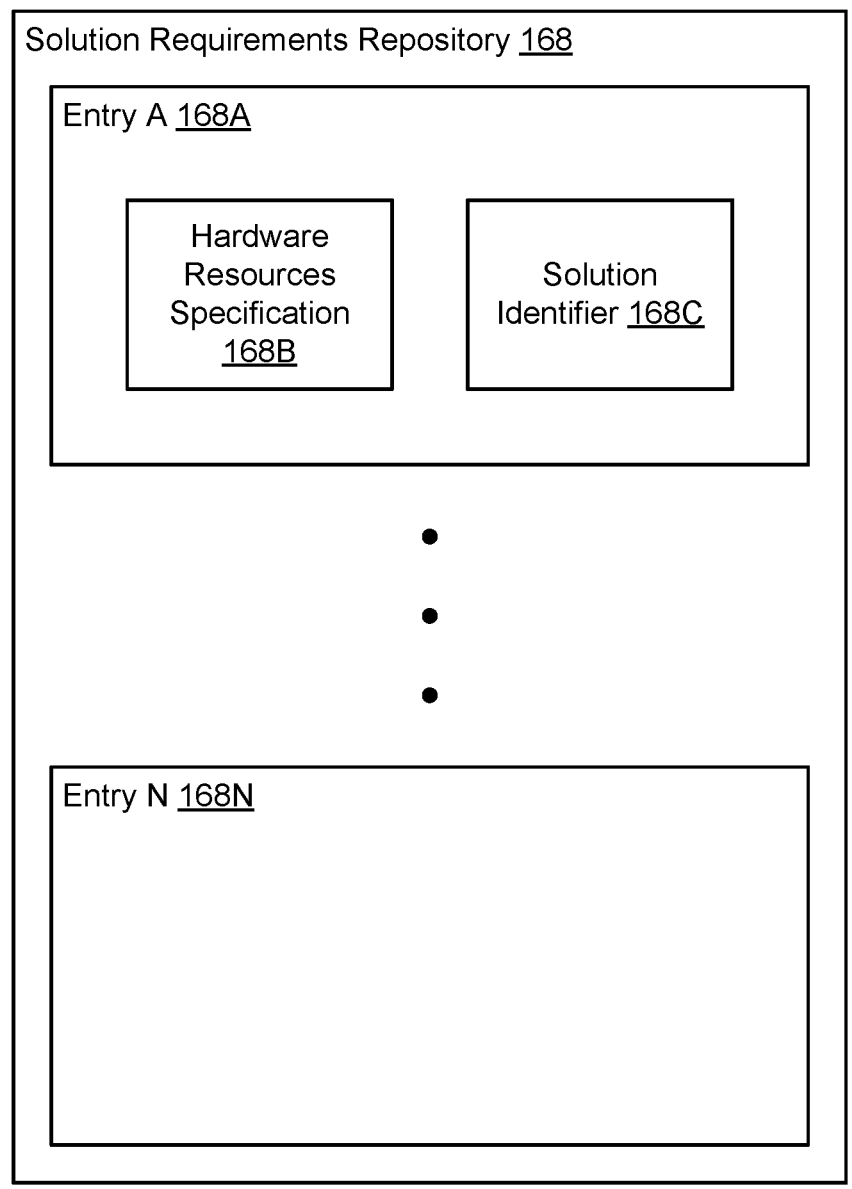
FIG. 1E shows a block diagram illustrating a solution requirements repository in accordance with an embodiment.

Subscription information repository 164 may be implemented with one or more data structures that store information regarding subscriptions for a device that hosts local subscription manager 158. Refer to FIG. 1E for additional details regarding subscription information repository 164.

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by solution manager 160 when a condition is met, such as a subscription limit being exceeded or a new subscription being obtained.

In an embodiment, action repository 166 includes at least one set of actions keyed to changes in subscription of a management entity for the host managed system. The actions may include (i) restarting/initializing a host managed system, (ii) after doing so, interrupting a normal startup process performed by the host managed system prior to the host managed system booting to a management entity, (iii) while the normal startup process is interrupted, dynamically configuring a management entity, and/or (iv) resuming the normal startup process such that the host managed systems hands off, after startup, operation of the managed system to the dynamically configured management entity. In this manner, the management entity utilized by a host managed system may be dynamically changed over time to meet the needs of users of the host managed system.

Host manifest 167 may be implemented with one or more data structures that store information regarding hardware resources of a host managed system. The information may include, for example, a list of hardware devices, the type of each hardware device, capabilities of each hardware devices, and/or other information regarding the hardware resources of the host managed system.

Solution requirements repository 168 may be implemented with one or more data structures that store information regarding hardware resource requirements for any number of solutions. The information may include, for example, a list of solutions and corresponding hardware resources required for each of the solutions including, for example, list of hardware devices, the type of each hardware device, capabilities of each hardware devices, and/or other information regarding the hardware resources that should be available for a solution to be implemented by a managed system.

Compatible solutions repository 169 may be implemented with one or more data structures that store information regarding solutions which a host managed system is likely to be able to implement. The information may include, for example, a list of identifiers of the solutions, identifiers of software stacks for each identified solution, information regarding where images of applications or other entities for the identified software stacks may be obtained, and/or other types of information usable to allow local subscription manager 158 to identify whether a solution is compatible with a host managed system and/or allow local subscription manager 158 to implement a solution (e.g., by automatically retrieving and deploying a software stack).

While various data structures have been illustrated and described in FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to local subscription manager 158 (e.g., in a storage of a deployment manager or subscription management service) in a manner that is still accessible to local subscription manager 158.

While illustrated in FIG. 1D with a limited number of specific components, a local subscription manager may include additional, fewer, and/or different components without departing from embodiments disclosed herein.

Turning to FIG. 1E, a block diagram of solutions requirements repository 168 in accordance with an embodiment is shown. As discussed above, solutions requirements repository 168 may be hosted by a local subscription manager or another entity. Solutions requirements repository 168 may include information usable to identify which solutions are compatible with a host manage system.

Solution requirements repository 168 may include any number of entries 168A, 168N corresponding to any number of solutions. Each entry may include a hardware resources specification (e.g., 168B) and a solution identifier (e.g., 168C). Hardware resources specification 168B may specify quantities (e.g., minimum) and types of hardware resources necessary to be available to a host managed system to provide a solution identified by a solution identifier (e.g., 168C) associated with the specification. A hardware manifest for a host managed system may be compared to a hardware resources specification to identify whether the host managed system is able to provide the solution specified by solution identifier 168C.

Solution identifier 168C may indicate or identify a corresponding solution. For example, solution identifier 168C may include information usable to implement a solution such as a location of an image (e.g., a software image) which when hosted by a managed system causes the managed system to provide the solution.

A hardware manifest may be matched to any number of entries thereby allowing for the identification of multiple solutions which may be implemented by a correspond managed system.

While illustrated in FIG. 1E with a limited number of specific types of information, a solutions requirement repository may include additional, fewer, and/or different types of information without departing from embodiments disclosed herein. While described with respect to a list of entries, solution requirements repository 168 may be implemented using different types of data structures without departing from embodiments disclosed herein.

Figure 1F:
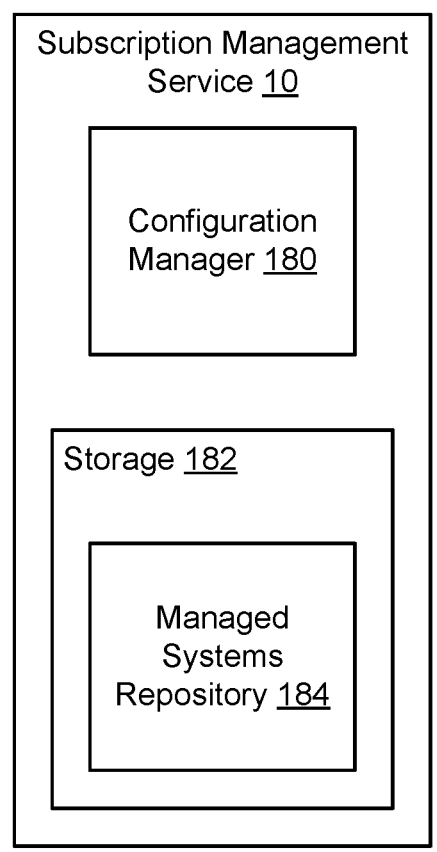
FIG. 1F shows a block diagram illustrating a subscription management service in accordance with an embodiment.

Turning to FIG. 1F, a diagram of subscription management service 10 in accordance with an embodiment is shown. As discussed above, subscription management service 10 may facilitate automatic configuration of any number of managed systems to provide desired solutions to which a user has subscribed the managed systems (or to which the user has subscribed).

To provide its functionality, subscription management service 10 may include configuration manager 180 and storage 182. Each of these components is discussed below.

Configuration manager 180 may provide managed system configuration services. The managed system configuration services may include (i) obtaining information regarding hardware resources of managed system to identify compatible solutions or obtaining information regarding compatible solutions from the managed systems, (ii) presenting information regarding the compatible solutions to users to facilitate improved solution selection, and (iii) based on selections from the users, deploying compatible solutions to the managed system.

In an embodiment, configuration manager 180 is implemented using a hardware device including circuitry. The hardware device may be, for example, a digital signal processor, a field programmable gate array, or an application specific integrated circuit. The circuitry may be adapted to cause the hardware device to perform the functionality of configuration manager 180. Configuration manager 180 may be implemented using other types of hardware devices without departing embodiment disclosed herein.

In one embodiment, configuration manager 180 is implemented using a processor adapted to execute computing code stored on a persistent storage that when executed by the processor performs the functionality of configuration manager 180 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 182 is implemented using physical devices that provide data storage services (e.g., storing data and providing copies of previously stored data). The devices that provide data storage services may include hardware devices and/or logical devices. For example, storage 182 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 182 may include a memory device (e.g., a dual in line memory device) in which data is stored and from which copies of previously stored data are provided. In another example, storage 182 may include a persistent storage device (e.g., a solid-state disk drive) in which data is stored and from which copies of previously stored data is provided. In a still further example, storage 182 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 182 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 182 may store data structures including managed system repository 184. Managed system repository 184 may be implemented with one or more data structures in which information usable to manage managed systems is stored. The information may include (i) listings of managed systems, (ii) information regarding hardware resources of the listed managed systems, (iii) information regarding solution compatibilities of the listed managed systems, (iv) information usable to identify the solution compatibilities based on the hardware resources information for the listed managed systems, (v) information regarding solutions deployed to the listed managed systems (e.g., listing of deployed software stacks), and/or (vi) other information usable to manage any number of managed systems to facilitate provisioning of computer implemented services to one or more users.

In an embodiment, subscription management service is implemented as a service provided by a first organization which allows users of another organization to modify the operation of hardware from the first organization that is utilized by users of the second organization. The users of the second organization may subscribe to solutions provided by the first organization through the hardware from the first organization. The first organization may be responsible for management of the hardware to meet the subscriptions of the users of the second organization.

While illustrated in FIG. 1F with a limited number of specific components, a subscription management service may include additional, fewer, and/or different components without departing from embodiments disclosed herein. While FIGS. 1A-1F have been illustrated using blocks representing different entities, the functionality (all, or a portion) of any of these entities may be combined with any of the other illustrated entities. Likewise, the functionality (all, or a portion) of any of these entities may be divided across any number entities (e.g., in addition to those illustrated in and/or described with respect to these figures).

Figure 2:
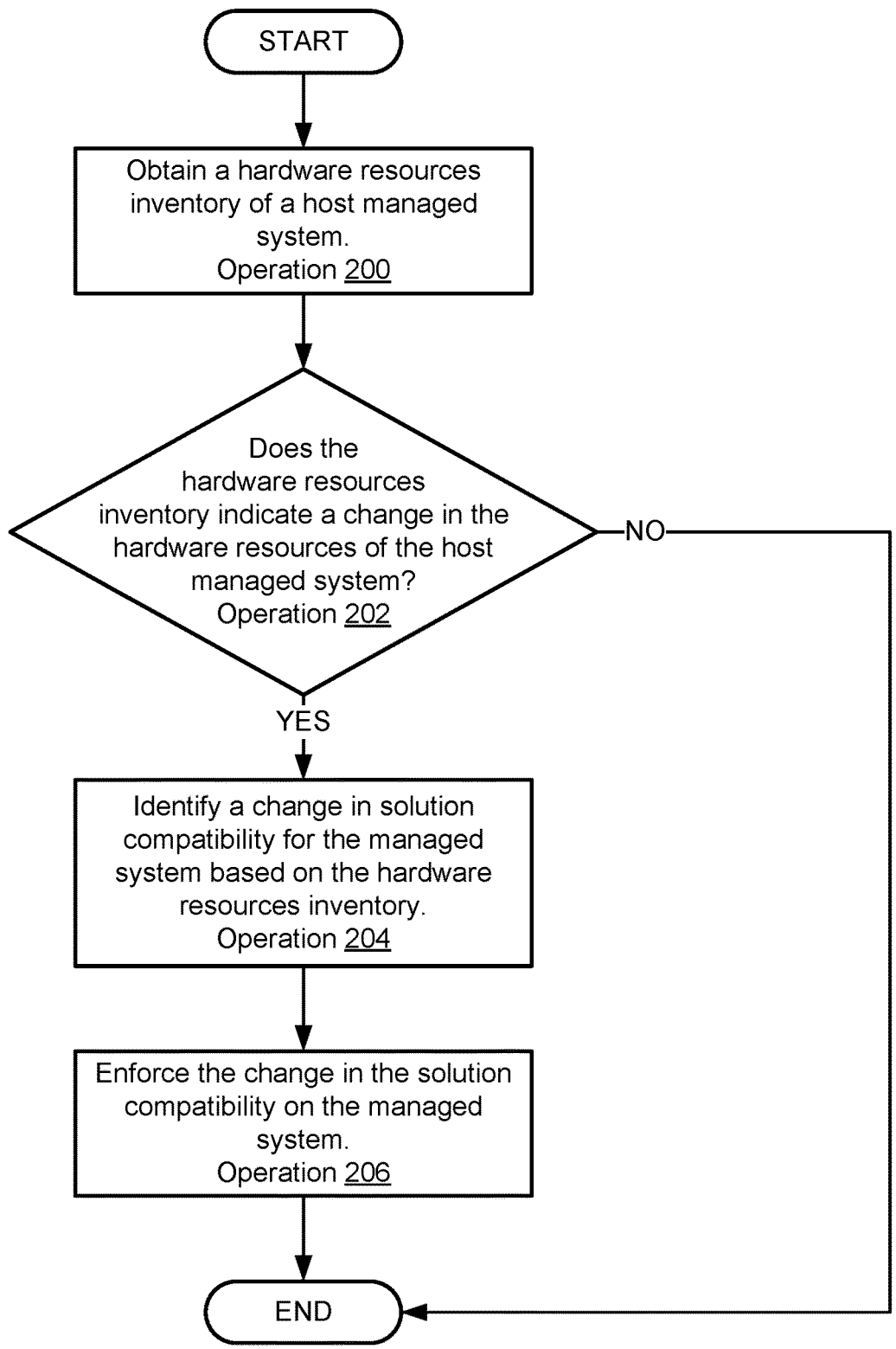
FIG. 2 shows a flow diagram illustrating a method of enforcing changes in solution compatibility in accordance with an embodiment.
Figure 3:
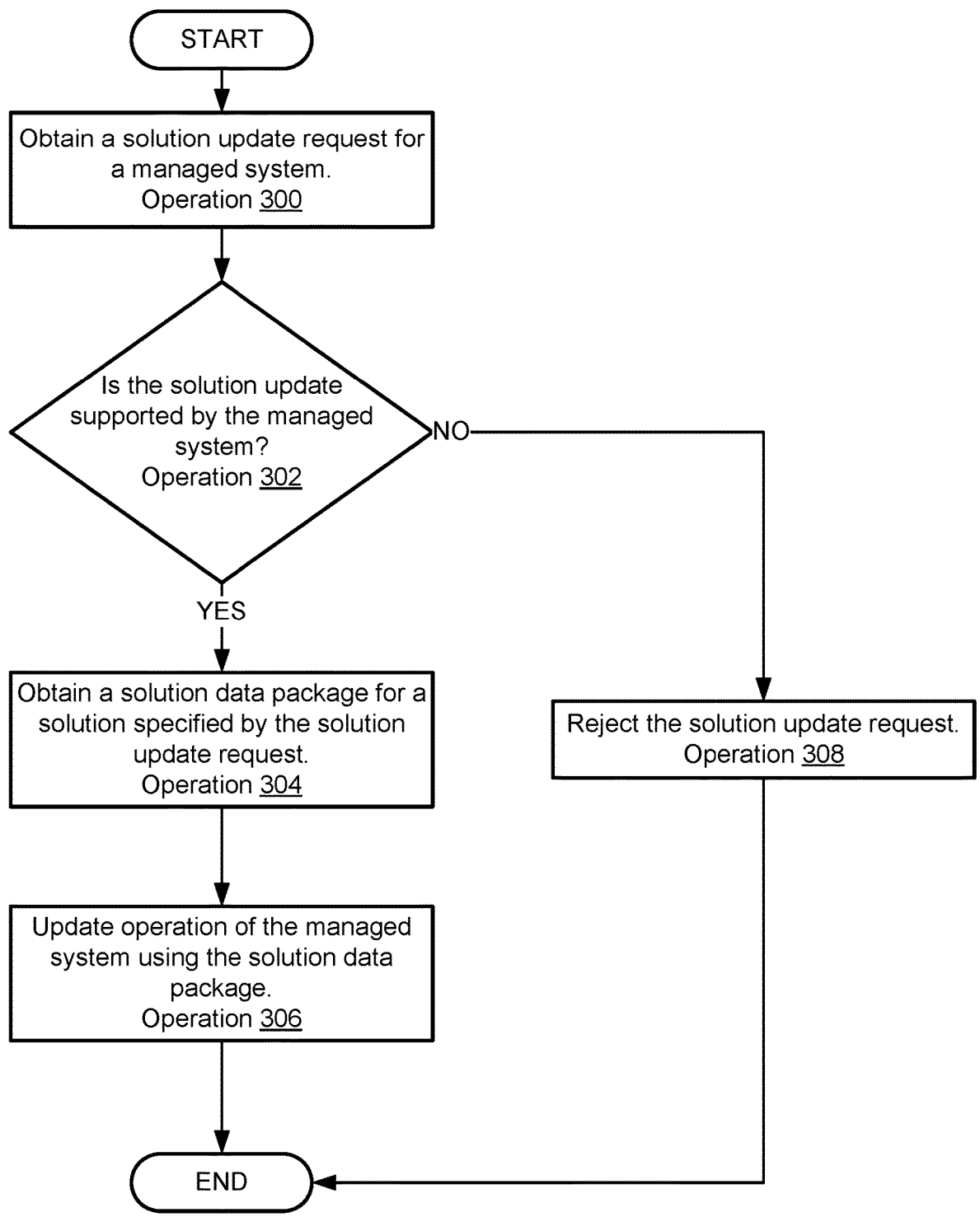
FIG. 3 shows a flow diagram illustrating a method of deploying a compatible solution to a managed system in accordance with an embodiment.

As discussed above, the components of FIG. 1A may perform various methods to provide computer implemented services using managed systems that may provide respective solutions limited based on the hardware resources of the respective managed systems. FIGS. 2-3 illustrate examples of methods that may be performed by the components of FIG. 1A. For example, a local subscription manager of a managed system, a deployment manager, and/or a subscription management service may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of enforcing changes in solution compatibilities on a managed system in accordance with an embodiment is shown. The method illustrated in FIG. 2 may be performed when a startup or other type of initialization of a managed system is performed. For example, the method may be performed when a managed system is power cycled.

At operation 200, a hardware resources inventory for a host managed system is obtained. The hardware resources inventory may be obtained by a local subscription managed hosted by the managed system. The hardware resources inventory may be obtained from a startup manager of the managed system. For example, the startup manager may perform a hardware inventory as part of starting up the host managed system.

In an embodiment, the hardware resources inventory specifies (i) hardware components (all or a portion) of the host managed system, (ii) type information for the specified hardware components, (iii) capability information for the specified hardware components (e.g., how quickly data can be provided to or processed by hardware components), and/or (iv) other types of information usable to classify or characterize hardware components of a host managed system.

In an embodiment, the hardware resources inventory is obtained by sending a request, an interrupt, or other type of communication to the startup manager via an interconnect with which a local subscription manager is operably connected to one or more processors executing instructions (e.g., computer instructions) corresponding to the startup entity. The startup entity may provide the hardware resources inventory and/or information usable by the local subscription manager to obtain the hardware resources inventory.

At operation 202, a determination is made regarding whether the hardware resources inventory indicates a change in the hardware resources of the host managed system. The determination may be made by comparing the hardware resources inventory to a last obtained hardware resources inventory (e.g., which may be stored in the local subscription manager or elsewhere) for the managed system to identify whether there are any differences. If any differences are identified, then it may be determined that the hardware resources inventory indicates a change the hardware resources of the host managed system. Otherwise it may be determined that no change in the hardware resources of the host managed system is indicated by the hardware resources inventory.

If it is determined that a change is indicated, then the method may proceed to operation 204. Otherwise, the method may end following operation 202. Ending following operation 202 may indicate that no change in solution compatibility has occurred since a last startup, initialization, etc.

At operation, a change in solution compatibility for the managed system is identified based on the hardware resources inventory. The change may be identified by matching the hardware resources inventory to hardware resources for various solutions (e.g., which may be stored in a solutions requirements repository 168) to identify all of the solutions that may be implemented with the managed system. The identified solutions may then be compared to the solutions that were previously implementable (e.g., which may be specified in a compatible solutions repository 169) by the managed system to identify the change in solution compatibility.

The change in solution compatibility may be an expansion and/or contraction of solution capability. For example, replacement of a hardware component of a managed system may both remove compatibility with some solutions while adding compatibility with other solutions. In another example, removal of a hardware component of the managed system may remove compatibility with some solutions. In a further example, adding a new hardware component to the managed system may add compatibility with other solutions that were previously not compatible. Changes in hardware components may result in other solution compatibility changes without departing from embodiments disclosed herein. For example, an addition, remove, or replacement of a hardware resources may result in any combination of expansion and contraction of solution capability.

In an embodiment, the change in solution compatibility is identified by the local subscription manager. For example, the local subscription manager may identify the change in solution compatibility.

In an embodiment, the change in solution compatibility is identified by another entity such as a deployment manager, subscription management service, or other entity. The local subscription manager may send the hardware resource inventory to the other entity which may perform the comparison to identify the change in solution compatibility (or just identify all compatible solutions). The other entity may then provide the solution compatibility (or the identified compatible solutions) to the local subscription manager.

At operation 206, the change in the solution compatibility is enforced on the managed system. The change in solution compatibility may be enforced by preventing deployment of software stacks corresponding to incompatible solutions on the managed system.

In an embodiment, the change in the solution compatibility is enforced by providing information to other entities regarding the change in solution compatibility. The other entities may limit the solutions to which the managed system may be subscribed based on the information such that only compatible software stacks are deployed to the managed system.

In an embodiment, the change in the solution compatibility is enforced by rejecting any software stack deployment attempts (e.g., as part of new or changes in subscriptions) that are for incompatible solutions.

The method may end following operation 206.

Turning to FIG. 3, a flow diagram illustrating a method of implementing a solution with a managed system in accordance with an embodiment is shown. The method illustrated in FIG. 3 may be performed when a new solution for a managed system is to be implemented.

At operation 300, a solution update request for a managed system is obtained. The solution update request may be obtained from, for example, a subscription management service or a deployment manager. The solution update request may specify a new solution to be implemented by the managed system. For example, the solution update request may specify any number of enablement and/or disablement operations to be performed to implement the new solution. These actions may cause a software stack corresponding to the new solution to be deployed to the managed system.

At operation 302, a determination is made regarding whether the solution update is supported by the managed system. The determination may be made by comparing the new solution to the solutions that are compatible with the managed system. If the new solution is not part of the compatible solutions, then it may be determined that the solution update is not supported by the managed system.

If it is determined that the solution update is not supported by the managed system, then the method may proceed to operation 308. Otherwise, the method may proceed to operation 304 following operation 302.

At operation 304, a solution data package for a solution specified by the solution update request is obtained. The solution data package may be obtained by downloading it from a deployment manager or other source. The solution update request may include information usable to identify the location of the solution data package. The solution data package may include a software stack corresponding to the solution specified by the solution update request.

At operation 306, operation of the managed system is updated using the solution data package. For example, the software stack may be deployed to the managed system (e.g., by installing it). The solution data package may include any number and types of applications, operating systems, drivers, etc.

For example, if a subscription management service or deployment manager is performing the method, then the service or manager may send subscription update requests to the local subscription manager of the managed system. The local subscription manager may then take action based on the subscription change requests to deploy the software stack. If the local subscription manager is performing the method, then the local subscription manager may update its subscription information and enforce the updated subscription on the host managed system by downloading and installing the software stack on the host managed system.

The method may end following operation 306.

Returning to operation 302, the method may proceed to operation 308 following operation 302 when the solution update is not supported by the managed system.

At operation 308, the solution update request is rejected. The solution update request may be rejected by not installing the software stack specified by the solution update request on the managed system.

For example, if a subscription management service or deployment manager is performing the method, then the service or manager may not send the request to the local subscription manager of the managed system. If the local subscription manager is performing the method, then the local subscription manager may discard the solution update request without performing any of the enablement/disablement actions specified in the request.

The method may end following operation 308.

Figure 4A:
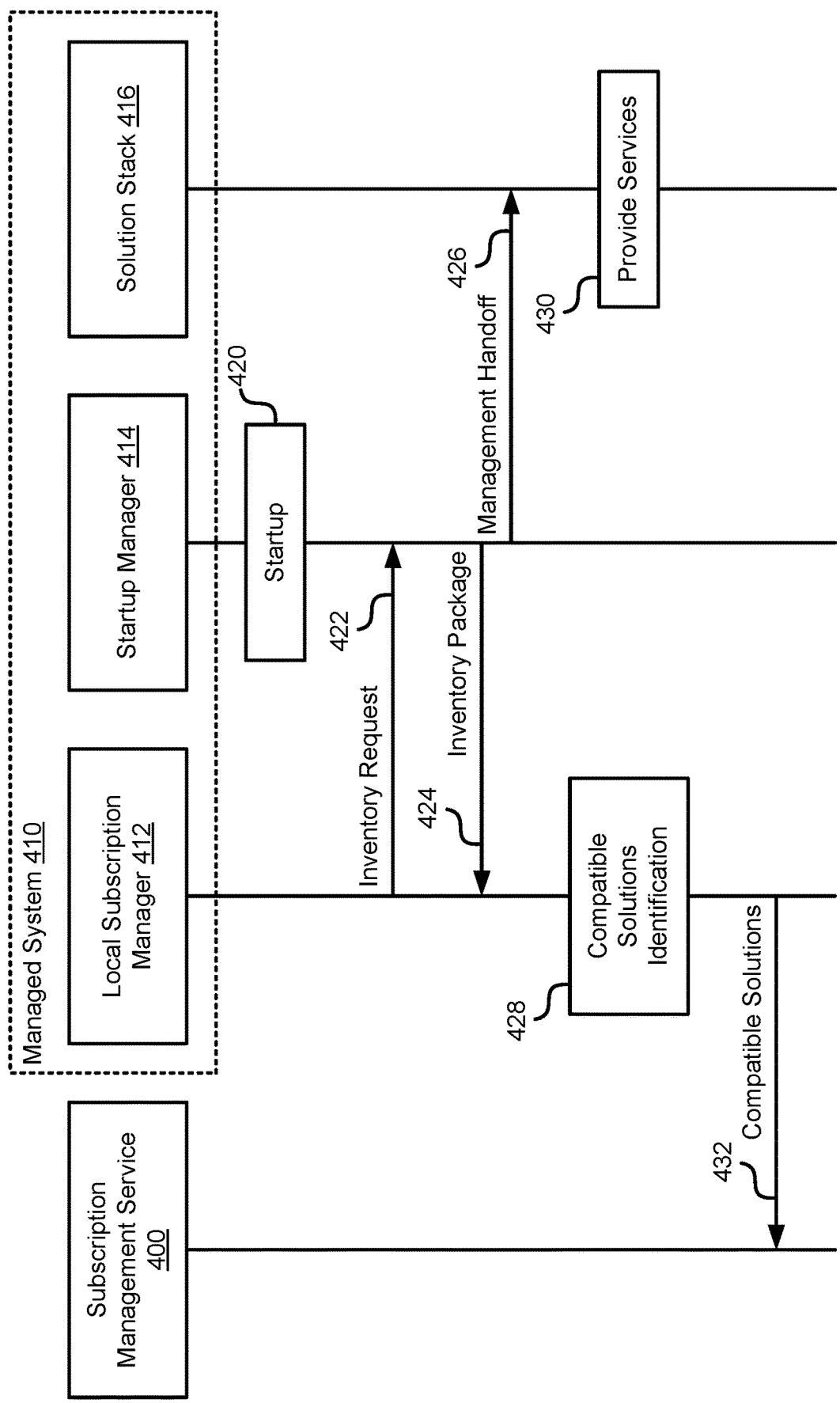

Turning to FIGS. 4A-4B, interaction diagrams in accordance with an embodiment are shown. In these figures, a system similar to that illustrated in FIG. 1A may be operating. In these figures, operations performed by the respective components are shown along the lines extending from the corresponding boxes labeled with the component names.

Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

Turning to FIG. 4A, an interaction diagram illustrating a process of managing changed solution compatibilities in accordance with an embodiment is shown. In FIG. 4A, managed system 410 may be starting up for the first time and may need to provide information regarding its solution capabilities to subscription management service 400 for management purposes.

At block 420, startup manager 414 hosted by hardware resources of managed system 410 beings to perform a startup of managed system 410. The startup includes inventorying the hardware resources of managed system 410.

At block 422, local subscription manager 412 requests the hardware resource inventory from startup manager 414. At block 424 startup manager 414 provides an inventory package to local subscription manager 412. The inventory package includes information regarding the hardware resources of managed system 410.

At block 426, startup manager 414 finishes startup 414 and performs a management handoff to solution stack 416. Solution stack 416 may include an operating system, applications, drivers, and/or other entities that provide computer implemented services consistent with a solution provided by managed system 410.

At block 428, local subscription manager 412 performs a compatible solutions identification using the inventory package. By doing so, local subscription manager 412 is able to identify the solutions compatible with managed system 410.

Meanwhile, at block 430, solution stack 416 begins to provide services in accordance with a solution to which managed system 410 is subscribed.

At block 432, local subscription manager 412 provides subscription management service 400 with the identified compatible solutions.

In this manner, subscription management service 400 may notify users of the potential solutions that may be implemented with managed system 410 while also preventing solutions that may impair the operation of managed system 410 from being deployed to it.

Turning to FIG. 4B, an interaction diagram illustrating a process of managing solution deployment in accordance with an embodiment is shown. In FIG. 4B, managed system 410 be managed by subscription management service 400. A user of user device 450 may be tasked with selecting solutions implemented by managed system 410.

At block 460, user device 450 sends a solution options request to subscription managements service. Subscription management service 400, at block 462, generates an options list that specifies the solutions that managed system 410 is expected to be able to provide. At block 464, options list data is provided to user device 450.

Using the options list data, at block 466, user device 450 presents options to the users. For example, user device 450 may present a web page or other type of graphical user interface to the user of user device 450. The graphical user interface may allow the user to be appraised of the compatible solutions as well as select one or more of the compatible solutions.

At block 468, an option selection is obtained. For example, the user may utilize a pointing device or other interface device to select one of the presented compatible solutions.

At block 470, the option selected is provided to subscription management service 400. In response, at block 472, subscription management service may perform a subscription update based on the option selection. Once the subscription update is made, subscription management service 400, at block 474, performs a software and subscription deployment for managed system 410 to deploy a software stack corresponding to the compatible solution selected by the user and place managed system 410 into condition to deny access to the solution if the subscription for the selected operation expires.

Thus, via the processes illustrated in FIGS. 4A-4B, embodiments disclosed herein may provide for the automated collection and display of information usable to allow users to make informed decisions regarding solutions to which the users may subscribe managed system. Further, the disclosed embodiments may also provide a method for automatically deploying the selected solution to the managed systems.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

As discussed above, various components may be implemented with computing devices. For example, any of the components illustrated in FIGS. 1A-4B may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for managing computer implemented services provided by a managed system, the method comprising:

identifying, by a local subscription manager hosted within the managed system, that a startup of the managed system is being initiated after the managed system is powering on after being power cycled, the startup placing the managed system in an operating state where the managed system is unable to provide the computer implemented services, the computer implemented services being associated with one or more applications hosted by the managed system, the one or more applications being unable to operate while the managed system is in the operating state;

obtaining, by the local subscription manager, an inventory for the managed system from a startup entity of the managed system performing the startup, the startup entity comprising a basic input output system (BIOS) of the managed system, and the local subscription manager obtains the inventory for the managed system from the startup entity by, at least:

sending an interrupt to the BIOS of the managed system to interrupt the startup of the managed system and cause the BIOS to provide the inventory to the local subscription manager, wherein the BIOS begins directly inventorying resources of the managed system to generate the inventory for the managed system when the startup of the managed system is initiated and before receiving the interrupt;

making a determination, by the local subscription manager, that the inventory indicates a change in hardware resources of the managed system;

in response to the determination:
identifying, by the local subscription manager, a change in solution compatibility for the managed system based on the inventory; and
enforcing, by the local subscription manager, the change in the solution compatibility on the managed system.

2. The computer-implemented method of claim 1, wherein making the determination comprises:
making a comparison of the inventory to a last obtained inventory, the last obtained inventory being stored in the local subscription manager; and
identifying one or more solutions based on the comparison,
wherein the comparison indicates that at least one hardware resource has been added to or removed from the managed system after a last startup of the managed system was completed.

3. The computer-implemented method of claim 1, wherein identifying the change in solution compatibility comprises:
matching the inventory to one or more entries of a solution requirements repository that specifies hardware resource requirements for a number of respective solutions, each of the number of respective solutions being associated with a correspond software stack for providing a corresponding solution of the number of respective solutions;
identifying one or more solutions based on the matching; and
making a comparison of a listing of solutions specified by a compatible solutions repository maintained by the local subscription manager to the identified one or more solutions; and
identifying the change in the solution compatibility based on the comparison, the change in solution compatibility indicating at least one of an addition of a new solution and a removal of a previously compatible solution.

4. The computer-implemented method of claim 1, wherein identifying the change in solution compatibility comprises:
providing a copy of the inventory to a management entity, the management entity being different from the BIOS of the managed system and being adapted to manage a software stack hosted by the managed system; and
receiving a list specifying, at least in part, the change in the solution compatibility, the list being received from the management entity.

5. The computer-implemented method of claim 4, wherein the management entity is hosted by a data processing system that is separated from the managed system, the managed system being operably connected to the data processing system.

6. The computer-implemented method of claim 1, wherein enforcing the change in the solution compatibility on the managed system comprises:
updating a compatible solutions repository based on the change in the solution compatibility;
after updating the compatible solutions repository:

receiving a solution update request;
making a second determination, based on the updated compatible solutions repository, that a solution specified by the solution update request is not compatible with the managed system; and
rejecting the solution update request,
wherein the compatible solutions repository, prior to being updated, indicated that the solution specified by the solution update request is compatible with the managed system.

7. The computer-implemented method of claim 1, wherein enforcing the change in the solution compatibility on the managed system comprises:
providing a deployment manager with a compatibility update data package, the compatibility update data package indicating, at least in part, addition of a new solution with which the managed system is compatible or removal of an existing solution with which the manages system is no longer compatible to screen the managed system from solution update requests that specify solutions which are incompatible with the managed system.

8. The computer-implemented method of claim 7, wherein the deployment manager manages a deployment comprising the managed system by providing the managed system with solution updates that are compatible with the managed system, and the deployment manager comprising a data processing system distinct from the managed system.

9. The computer-implemented method of claim 1, where the computer implemented services provided by the managed system corresponds to a software stack hosted by the hardware resources of the managed system, and the change in solution compatibility indicating an expansion or contraction of compatibility of the hardware resources with software stacks that may provide different computer implemented services.

10. A non-transitory machine-readable medium having instructions stored therein, which when executed by a processor, cause the processor to perform operations for managing computer implemented services provided by a managed system, the operations comprising:
identifying, by a local subscription manager hosted within the managed system, a startup of the managed system is being initiated after the managed system is powering on after being power cycled, the startup placing the managed system in an operating state where the managed system is unable to provide the computer implemented services, the computer implemented services being associated with one or more applications hosted by the managed system, the one or more applications being unable to operate while the managed system is in the operating state;
obtaining, by the local subscription manager, an inventory for the managed system from a startup entity of the managed system performing the startup, the startup entity comprising a basic input output system (BIOS) of the managed system, and the local subscription manager obtains the inventory for the managed system from the startup entity by, at least:
sending an interrupt to the BIOS of the managed system to interrupt the startup of the managed system and cause the BIOS to provide the inventory to the local subscription manager,
wherein the BIOS begins directly inventorying resources of the managed system to generate the inventory for the managed system when the startup of the managed system is initiated and before receiving the interrupt;

making a determination, by the local subscription manager, that the inventory indicates a change in hardware resources of the managed system;

in response to the determination:
  identifying, by the local subscription manager, a change in solution compatibility for the managed system based on the inventory; and
  enforcing, by the local subscription manager, the change in the solution compatibility on the managed system.

11. The non-transitory machine-readable medium of claim 10, wherein making the determination comprises:
  making a comparison of the inventory to a last obtained inventory, the last obtained inventory being stored in the local subscription manager; and
  identifying one or more solutions based on the comparison,
  wherein the comparison indicates that at least one hardware resource has been added to or removed from the managed system after a last startup of the managed system was completed.

12. The non-transitory machine-readable medium of claim 10, wherein identifying the change in solution compatibility comprises:
  matching the inventory to one or more entries of a solution requirements repository that specifies hardware resource requirements for a number of respective solutions, each of the number of respective solutions being associated with a correspond software stack for providing a corresponding solution of the number of respective solutions;
  identifying one or more solutions based on the matching; and
  making a comparison of a listing of solutions specified by a compatible solutions repository maintained by the local subscription manager to the identified one or more solutions; and
  identifying the change in the solution compatibility based on the comparison, the change in solution compatibility indicating at least one of an addition of a new solution and a removal of a previously compatible solution.

13. The non-transitory machine-readable medium of claim 10, wherein identifying the change in solution compatibility comprises:
  providing a copy of the inventory to a management entity, the management entity being different from the BIOS of the managed system and being adapted to manage a software stack hosted by the managed system; and
  receiving a list specifying, at least in part, the change in the solution compatibility, the list being received from the management entity.

14. A managed system, comprising:
a processor; and
a local subscription manager that is hosted within the managed system and adapted to perform operations for managing computer implemented services provided by a managed system, the operations comprising:
  identifying, by a local subscription manager of the managed system, a startup of the managed system is being initiated after the managed system is powering on after being power cycled, the startup placing the managed system in an operating state where the managed system is unable to provide the computer implemented services, the computer implemented services being associated with one or more applications hosted by the managed system, the one or more applications being unable to operate while the managed system is in the operating state;
  obtaining, by the local subscription manager, an inventory for the managed system from a startup entity of the managed system performing the startup, the startup entity comprising a basic input output system (BIOS) of the managed system, and the local subscription manager obtains the inventory for the managed system from the startup entity by, at least:
    sending an interrupt to the BIOS of the managed system to interrupt the startup of the managed system and cause the BIOS to provide the inventory to the local subscription manager,
    wherein the BIOS begins directly inventorying resources of the managed system to generate the inventory for the managed system when the startup of the managed system is initiated and before receiving the interrupt;
  making a determination, by the local subscription manager, that the inventory indicates a change in hardware resources of the managed system;
  in response to the determination:
    identifying, by the local subscription manager, a change in solution compatibility for the managed system based on the inventory; and
    enforcing, by the local subscription manager, the change in the solution compatibility on the managed system.

15. The managed system of claim 14, wherein making the determination comprises:
  making a comparison of the inventory to a last obtained inventory, the last obtained inventory being stored in the local subscription manager; and
  identifying one or more solutions based on the comparison,
  wherein the comparison indicates that at least one hardware resource has been added to or removed from the managed system after a last startup of the managed system was completed.

16. The managed system of claim 14, wherein identifying the change in solution compatibility comprises:
  matching the inventory to one or more entries of a solution requirements repository that specifies hardware resource requirements for a number of respective solutions, each of the number of respective solutions being associated with a correspond software stack for providing a corresponding solution of the number of respective solutions;
  identifying one or more solutions based on the matching; and
  making a comparison of a listing of solutions specified by a compatible solutions repository maintained by the local subscription manager to the identified one or more solutions; and
  identifying the change in the solution compatibility based on the comparison, the change in solution compatibility indicating at least one of an addition of a new solution and a removal of a previously compatible solution.

17. The managed system of claim 14, wherein identifying the change in solution compatibility comprises:
  providing a copy of the inventory to a management entity, the management entity being different from the BIOS of the managed system and being adapted to manage a software stack hosted by the managed system; and receiving a list specifying, at least in part, the change in the solution compatibility, the list being received from the management entity.

18. The managed system of claim 17, wherein the management entity is hosted by a data processing system that is separated from the managed system, the managed system being operably connected to the data processing system.

\* \* \* \* \*